United States Patent
Zamani et al.

(10) Patent No.: US 11,585,287 B2
(45) Date of Patent: Feb. 21, 2023

(54) CYLINDER DETECTION IN A FOUR-STROKE INTERNAL COMBUSTION ENGINE

(71) Applicant: Scania CV AB, Södertälje (SE)

(72) Inventors: Sebastian Zamani, Stockholm (SE); Andrey Gromov, Tumba (SE); Hans Svensson, Järfälla (SE); Ulrik Erikstam, Södertälje (SE); Anders Larsson, Tullinge (SE)

(73) Assignee: Scania CV AB, Södertälje (SE)

( * ) Notice: Subject to any disclaimer, the term of this patent is extended or adjusted under 35 U.S.C. 154(b) by 172 days.

(21) Appl. No.: 16/465,796

(22) PCT Filed: Nov. 28, 2017

(86) PCT No.: PCT/SE2017/051178
§ 371 (c)(1),
(2) Date: May 31, 2019

(87) PCT Pub. No.: WO2018/117930
PCT Pub. Date: Jun. 28, 2018

(65) Prior Publication Data
US 2020/0025123 A1 Jan. 23, 2020

(30) Foreign Application Priority Data
Dec. 19, 2016 (SE) .................. 1651669-2

(51) Int. Cl.
| | | |
|---|---|---|
| G01D 5/247 | (2006.01) | |
| F02D 41/34 | (2006.01) | |
| F02D 41/00 | (2006.01) | |

(52) U.S. Cl.
CPC .......... F02D 41/34 (2013.01); F02D 41/009 (2013.01); F01L 2820/041 (2013.01);
(Continued)

(58) Field of Classification Search
CPC .............. F02D 41/009; F02D 41/34; F02D 2041/0092; F01L 2820/041; F01L 2820/042
See application file for complete search history.

(56) References Cited

U.S. PATENT DOCUMENTS

| | | | | |
|---|---|---|---|---|
| 4,787,355 A | | 11/1988 | Maeda | |
| 5,251,600 A | * | 10/1993 | Britsch | .................. G01D 5/247 |
| | | | | 123/494 |

(Continued)

FOREIGN PATENT DOCUMENTS

| | | |
|---|---|---|
| CN | 1157023 A | 8/1997 |
| CN | 1198801 A | 11/1998 |

(Continued)

OTHER PUBLICATIONS

Scania CV AB, International Application No. PCT/SE2017/051178, International Preliminary Report on Patentability, dated Jun. 25, 2019.

(Continued)

*Primary Examiner* — Gonzalo Laguarda
(74) *Attorney, Agent, or Firm* — Moore & Van Allen PLLC; W. Kevin Ransom (57) ABSTRACT

An arrangement for cylinder detection in a four-stroke internal combustion engine is disclosed. The arrangement comprises a first disc connected to a crankshaft, the first disc comprising a first mark (M11-M13) within each an interspace angle ($\alpha$), and a second disc connected to a camshaft and comprising one second mark (M21-M26) per number of cylinders. The first mark (M11-M13) is arranged on a first disc, or the plurality of first marks (M11-M13) are arranged in relation to each other on the first disc, and the second marks (M21-M26) are arranged in relation to each other on the second disc such that for each interspace angle ($\alpha$) the relevant first mark (M11-M13) is detectable by a first sensor (Continued)

and the relevant second mark (M21-M26) is detectable by a second sensor at different relative rotational positions between the first disc and the second disc.

11 Claims, 5 Drawing Sheets

(52) U.S. Cl.
CPC . *F01L 2820/042* (2013.01); *F02D 2041/0092* (2013.01); *G01D 5/247* (2013.01)

(56) References Cited

U.S. PATENT DOCUMENTS

| | | | | |
|---|---|---|---|---|
| 5,329,904 | A * | 7/1994 | Kokubo | F02D 41/009 123/406.53 |
| 5,460,134 | A | 10/1995 | Ott et al. | |
| 5,469,823 | A * | 11/1995 | Ott | F02D 41/062 123/406.62 |
| 5,584,274 | A * | 12/1996 | Fukui | F02D 41/009 123/406.18 |
| 5,630,396 | A * | 5/1997 | Fukui | F02D 41/009 123/406.18 |
| 5,632,246 | A * | 5/1997 | Fukui | F02D 41/009 123/406.18 |
| 5,647,322 | A * | 7/1997 | Fukui | F02D 41/009 123/406.18 |
| 5,671,714 | A * | 9/1997 | Fukui | F02D 41/009 123/406.62 |
| 5,823,166 | A | 10/1998 | Entenmann et al. | |
| 6,474,278 | B1 | 11/2002 | Davis et al. | |
| 6,575,136 | B1 | 6/2003 | Namari | |
| 6,609,498 | B2 * | 8/2003 | Mathews | F02D 41/009 123/406.62 |
| 6,775,611 | B2 | 8/2004 | Kobayashi et al. | |
| 7,000,598 | B2 | 2/2006 | Sheikh et al. | |
| 8,818,685 | B2 | 8/2014 | Shimizu | |
| 2004/0000190 | A1 | 1/2004 | Hori et al. | |
| 2008/0087249 | A1 | 4/2008 | Namari et al. | |
| 2008/0295803 | A1 | 12/2008 | Snopko et al. | |
| 2012/0227696 | A1 | 9/2012 | Gallmeyer | |
| 2012/0303251 | A1 | 11/2012 | Shimizu | |
| 2013/0125847 | A1 | 5/2013 | Wang et al. | |
| 2013/0151194 | A1 * | 6/2013 | Hawken | F02D 41/222 702/151 |
| 2015/0114097 | A1 * | 4/2015 | Zouboff | G01M 15/046 73/114.26 |

FOREIGN PATENT DOCUMENTS

| | | |
|---|---|---|
| CN | 1233711 A | 11/1999 |
| CN | 1441158 A | 9/2003 |
| CN | 1687712 A | 10/2005 |
| CN | 1702309 A | 11/2005 |
| CN | 1820134 A | 8/2006 |
| CN | 101210522 A | 7/2008 |
| CN | 101839184 A | 9/2010 |
| CN | 203321689 U | 12/2013 |
| CN | 105736157 A | 7/2016 |
| DE | 3804481 A1 | 8/1988 |
| DE | 19808744 A1 | 5/1999 |
| EP | 0572584 A1 | 12/1993 |
| EP | 0831224 A2 | 3/1998 |
| EP | 0905375 A2 | 3/1999 |
| JP | H08277744 A | 10/1996 |
| JP | H10103946 A | 4/1998 |

OTHER PUBLICATIONS

Scania CV AB, International Application No. PCT/SE2017/051178, International Search Report, dated Mar. 21, 2018.
Scania CV AB, International Application No. PCT/SE2017/051178, Written Opinion, dated Mar. 21, 2018.
Scania CV AB, Swedish Application No. 1651669-2, Office Action, dated Sep. 15, 2017.
Scania CV AB, Korean Application No. 10-2019-7019954, Office Action, dated May 22, 2020.
Scania CV AB, Chinese Patent Application No. 201780076166.3, First Office Action, dated May 14, 2021.
Scania CV AB, European Patent Application No. 17817307.6, Communication pursuant to Article 94(3) EPC, dated Apr. 13, 2022.
Scania CV AB, Brazilian Patent Application No. BR112019010900-5, Preliminary Office Action, dated Jul. 26, 2022.
Scania CV AB, Chinese Patent Application No. 201780076166.3, Second Office Action, dated Sep. 13, 2021.

* cited by examiner

CYLINDER DETECTION IN A FOUR-STROKE INTERNAL COMBUSTION ENGINE

CROSS-REFERENCE TO RELATED APPLICATIONS

This application is a national stage application (filed under 35 § U.S.C. 371) of PCT/SE2017/051178, filed Nov. 28, 2017 of the same title, which, in turn, claims priority to Swedish Application No. 1651669-2 filed Dec. 19, 2016; the contents of each of which are hereby incorporated by reference.

FIELD OF THE INVENTION

The invention relates to an arrangement for cylinder detection in a four-stroke internal combustion engine, a four-stroke internal combustion engine comprising an arrangement for cylinder detection, and to a method for cylinder detection in a four-stroke internal combustion engine. The invention further relates to a computer program and a computer program product for performing a method for cylinder detection in a four-stroke internal combustion engine.

BACKGROUND

An internal combustion engine comprises cylinders, each with a piston arranged to reciprocate in a cylinder bore of the relevant cylinder. A control system of the internal combustion engine is configured to control various functions of the internal combustion engine, such as e.g. fuel injection into a cylinder when the relevant piston is near an ignition top dead center. Accordingly, the control system requires an indication of when a particular piston reaches its ignition top dead center, or at least an indication of which particular piston is about to reach its ignition top dead center. For this purpose, a flywheel of the internal combustion engine may be provided with one mark for determining a particular position of a crankshaft of the internal combustion engine. The relevant ignition top dead center positions of the pistons for each revolution of the crankshaft are counted, or calculated, from the one mark. If count is lost, or when the engine is to be started, the crankshaft has to be rotated until the one mark is detected before the engine control system can adequately control fuel injection into the respective cylinders of the engine.

U.S. Pat. No. 5,469,823 discloses a sensor arrangement for cylinder detection in a multi-cylinder internal combustion engine. The combustion engine has a crankshaft sensor with an increment disc with reference mark and a camshaft sensor with long and short segments as well as short and long intermediate spaces between the segments. By means of common evaluation of the pulse sequences supplied by the two sensors, the length of high phases and low phases can be determined. Since the reference mark is taken into account during the evaluation, the number of different segment lengths on the camshaft sensor disc is reduced and unambiguous cylinder detection can be achieved. The evaluation of the crankshaft signal and camshaft signal permits control of the internal combustion engine. In the event of failure of the crankshaft sensor, emergency running of the internal combustion engine can be realized solely with the aid of the camshaft sensor.

U.S. Pat. No. 5,329,904 discloses an engine control apparatus for distinguishing each cylinder of an engine and comprises a crank angle rotor having a configuration representing a crankshaft angle of an engine, and a crank angle sensor operatively associated with the crank angle rotor to generate a crank angle signal in accordance with the configuration of the crank angle rotor. The configuration of the crank angle rotor includes first and second silent sections. The first silent section is cooperative with the crank angle sensor to constitute a part for generating a first level non-pulsation component of the crank angle signal. The second silent section being cooperative with said crank angle sensor to constitute a part for generating a second level non-pulsation component of the crank angle signal. There is further provided a cam angle rotor having a configuration representing a camshaft angle, which is operatively associated with a cam angle sensor for generating a cam angle signal to provide a plurality of different kinds of signal level sequences with respect to the first and second silent sections of the crank angle rotor. A cylinder discriminating device distinguishes each cylinder of the engine on the basis of the level of the non-pulsation component of the crank angle signal and the signal level sequences of the cam angle signal.

U.S. Pat. No. 6,575,136 discloses an apparatus for detecting crank angle position in an internal combustion engine, in which a first rotator, which is interlocked with the crankshaft, has a plurality of detectable parts in the rotation direction. The detectable parts on the first rotator are provided so that adjoining spaces are nearly equal to each other. A second rotator which is interlocked with the camshaft has a plurality of detectable parts in the rotation direction. The detectable parts on the second rotator are provided so that permutations each consisting of at least two of consecutive angle intervals in one rotation direction differ from each other. With this configuration, the stroke of an internal combustion engine can be determined.

SUMMARY OF THE INVENTION

It is an object of the invention to provide an alternative arrangement configured for distinguishing each cylinder of a four-stroke internal combustion engine.

According to an aspect of the invention, the object is achieved by an arrangement for cylinder detection in a four-stroke internal combustion engine. The four-stroke internal combustion engine comprises a crankshaft, at least two cylinders with one piston each, and a camshaft connected to the crankshaft. The crankshaft performs a 720-degree rotation while the camshaft performs a 360-degree rotation. Each piston is connected to the crankshaft and reciprocates in its cylinder, each piston being arranged to assume one ignition top dead center position corresponding to a top rotational position of the crankshaft over the 720-degree rotation of the crankshaft. An interspace angle of the crankshaft extends between each of the top rotational positions. The arrangement comprises:

a first disc connected to the crankshaft, the first disc comprising a first mark within each interspace angle, a second disc connected to the camshaft and comprising one second mark per number of cylinders, a fixed first sensor for detecting the first mark, or first marks, a fixed second sensor for detecting the second marks, and a combustion engine control unit configured to receive signals from the first sensor and the second sensor. The first mark is arranged on the first disc, or the first marks are arranged in relation to each other on the first disc, and the second marks are arranged in relation to each other on the second disc such that for each interspace angle the relevant first mark is detectable by the first sensor and the relevant second mark is detectable by the second sensor at different relative rotational positions between the first disc and the second disc.

Since the first mark is arranged on the first disc, or the first marks are arranged in relation to each other on the first disc (in cases where the engine comprises more than two cylinders), and the second marks are arranged in relation to each other on the second disc—such that for each interspace angle the relevant first mark is detectable by the first sensor and the relevant second mark is detectable by the second sensor at different relative rotational positions between the first disc and the second disc, each of the at least two cylinders is identifiable based on the detected different relative rotational positions of a first mark on the first disc and a second mark the second disc. More specifically, the particular cylinder for which its piston is about to reach its ignition top dead center position is identifiable in this manner. Thus, the arrangement provides conditions for distinguishing each of the at least two cylinders of the four-stroke internal combustion engine. As a result, the above mentioned object is achieved.

Determining for which cylinder in a four-stroke internal combustion engine the piston is about to reach its ignition top dead center position is important from an engine control perspective, e.g. for determining into which cylinder next to inject fuel. The relative rotational position between a relevant first mark on the first disc and a relevant second mark on the second disc within a first interspace angel, may for instance be 12° on the first disc, or 6° on the second disc. The first interspace angle corresponds to a first piston subsequently reaching its ignition top dead center position. For a second interspace angle, corresponding to a second piston subsequently reaching its ignition top dead center position, the relative rotational position between a relevant first mark on the first disc and a relevant second mark on the second disc may be e.g. 20° on the first disc, or 10° on the second disc. Accordingly, the combustion engine control unit may identify which of the first piston and the second piston will be next in turn to reach its ignition top dead center position depending on whether the relative rotational position is 12 degrees or 20 degrees on the first disc.

The four-stroke internal combustion engine may also be referred to as the combustion engine, or the engine. The four-stroke internal combustion engine may comprise more than two cylinders. Each piston of the four-stroke internal combustion engine performs four-strokes during the 720° rotation of the crankshaft, an intake stroke, a compression stroke, a power stroke, and an exhaust stroke. A piston reciprocates between a bottom dead center, BDC, and a top dead center, TDC. During the 720° rotation of the crankshaft, a piston passes the BDC twice and the TDC twice. The TDC between the compression and power strokes is herein referred to as the ignition top dead center position. For each of the ignition top dead center positions of the pistons of the engine, the crankshaft has a top rotational position. Between adjacent such top rotational positions, the crankshaft performs a rotational covering an interspace angle. Put differently, an interspace angle of the crankshaft extends between two top rotational positions. A number of interspace angles form together the 720° rotation of the crankshaft. Depending on the configuration of the cylinders of the engine, the interspace angles may be the same between the different top rotational positions, or the interspace angles may be different between at least some of the top rotational positions. In the former case, a six-cylinder engine may have e.g. six interspace angles of 120°, providing the six ignition top dead center positions of the pistons symmetrically over the 720° rotation of the crankshaft. An example of the latter type of engine may be a V2 two-cylinder engine, wherein one interspace angle may exceed 360°, while the other interspace angle is less than 360°. Together, the two interspace angles add up to 720° rotation of the crankshaft. The first disc may for instance form part of a flywheel of the engine.

The invention also relates to a four-stroke internal combustion engine comprising an arrangement for cylinder detection according to any one of the aspects and/or embodiments discussed herein.

It is a further object of the invention to provide an alternative method for distinguishing each cylinder of a four-stroke internal combustion engine.

According to a further aspect of the invention, the object is achieved by a method for cylinder detection in a four-stroke internal combustion engine. The four-stroke internal combustion engine comprises a crankshaft, at least two cylinders with one piston each, and a camshaft connected to the crankshaft. The crankshaft performs a 720-degree rotation while the camshaft performs a 360-degree rotation. Each piston is connected to the crankshaft and reciprocates in its cylinder. Each piston is arranged to assume an ignition top dead center position corresponding to a top rotational position of the crankshaft over the 720-degree rotation of the crankshaft. An interspace angle of the crankshaft extends between each of the top rotational positions. The arrangement comprises a first disc connected to the crankshaft, the first disc comprising a first mark within each interspace angle; a second disc connected to the camshaft and comprising one second mark per number of cylinders; a fixed first sensor for detecting the first mark, or first marks; a fixed second sensor for detecting the second marks; and a combustion engine control unit configured to receive signals from the first sensor and the second sensor. The first mark is arranged on the first disc, or the first marks are arranged in relation to each other on the first disc and the second marks are arranged in relation to each other on the second disc such that for each interspace angle the relevant first mark is detectable by the first sensor and the relevant second mark is detectable by the second sensor at different relative rotational positions between the first disc and the second disc. The method comprises steps of:

detecting the first mark, or one of the first marks, with the first sensor, detecting one of the second marks with the second sensor, and determining a relative rotational position between the first disc and the second disc based on the step of detecting the first mark, or one of the first marks, and the step of detecting one of the second marks.

The invention further relates to a computer program for performing a method for cylinder detection in a four-stroke internal combustion engine, wherein the computer program comprises computer readable code configured to cause a calculation unit of a combustion engine control unit to perform a method according to any one of aspects and embodiments discussed herein.

The invention further relates to a computer program product for performing a method for cylinder detection in a four-stroke internal combustion engine, wherein the computer program comprises computer readable code configured to cause a calculation unit of a combustion engine control unit of the four-stroke internal combustion engine to perform a method according to any one of aspects and embodiments discussed herein.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
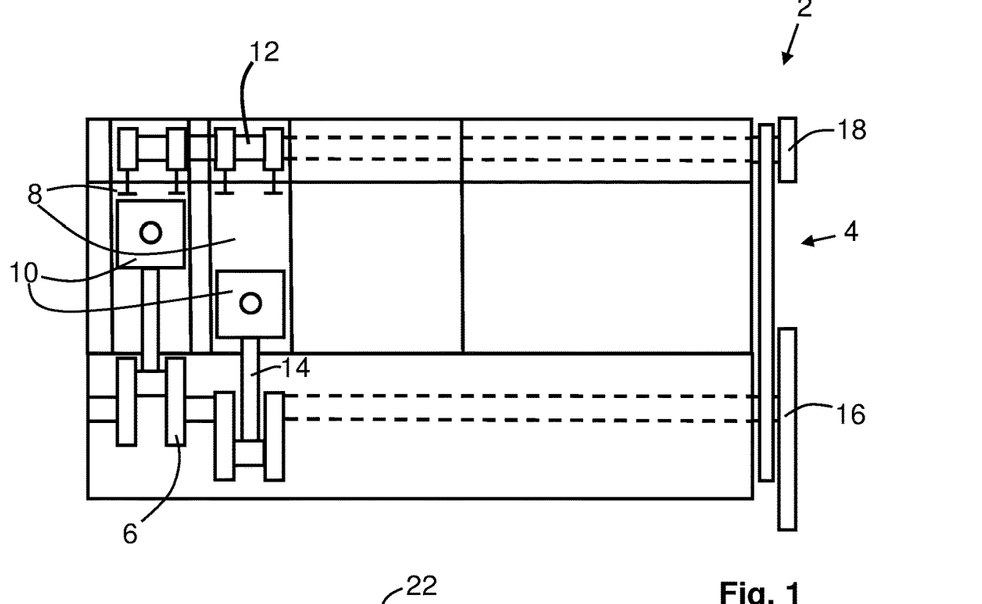
FIG. 1 illustrates embodiments of a four-stroke internal combustion engine comprising an arrangement for cylinder detection.

FIG. 1 illustrates embodiments of a four-stroke internal combustion engine 2 comprising an arrangement 4 for cylinder detection. The four-stroke internal combustion engine 2 comprises a crankshaft 6, at least two cylinders 8 with one piston 10 each, and a camshaft 12. The camshaft 12 is connected to the crankshaft 6 e.g. via a drive belt or a chain. A 2:1 transmission ratio between the crankshaft 6 and the camshaft 12 provides for the crankshaft 6 to perform a 720-degree rotation while the camshaft performs a 360-degree rotation, as is common in a four-stroke internal combustion engine.

Each piston 10 of the engine 2 is connected to the crankshaft 6, e.g. via a connecting rod 14. Each piston 10 reciprocates in a cylinder bore of its cylinder 8 between a top dead center, TDC, and a bottom dead center, BDC, thus, rotating the crankshaft 6. Each piston 10 is arranged to assume one ignition top dead center position in between a compression stroke and a power stroke. Each ignition top dead center position corresponds to a top rotational position of the crankshaft 6. Accordingly, over its 720-degree rotation, the crankshaft 6 has the same number of top rotational positions as the engine 2 has cylinders, e.g. a crankshaft of a six-cylinder engine has six top rotational positions, and a crankshaft of a three-cylinder engine has three top rotational positions. The arrangement 4 for cylinder detection comprises a first disc 16 and a second disc 18.

Figure 2:
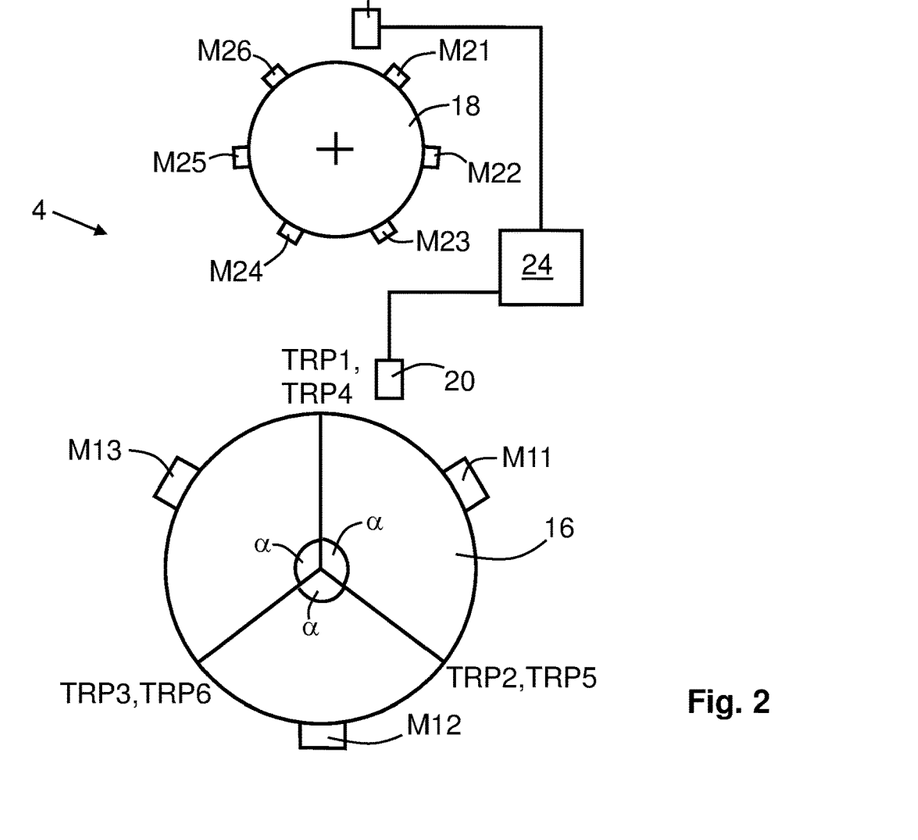
FIG. 2 illustrates embodiments of an arrangement for cylinder detection in a four-stroke internal combustion engine.

FIG. 2 illustrates embodiments of an arrangement 4 for cylinder detection in a four-stroke internal combustion engine, such as e.g. the engine 2 discussed in connection with FIG. 1. In these example embodiments, the engine discussed is a six-cylinder engine. However, the principles discussed may be extended to four-stroke internal combustion engines having different number of cylinders.

As mentioned above, the arrangement 4 comprises a first disc 16, which is connected to the crankshaft of the engine, and a second disc 18, which is connected to the camshaft of the engine. The arrangement 4 further comprises a first sensor 20 arranged in connection with the first disc 16, a second sensor 22 arranged in connection with the second disc 18, and a combustion engine control unit 24 configured to receive signals from the first sensor 20 and the second sensor 22. The first disc 16 comprises a number of first marks M11-M13. The second disc 18 comprises a number of second marks M21-M26. The first sensor 20 is fixedly arranged in relation to the engine. The first sensor 20 is arranged to detect the first marks M11-M13 as each of them passes the first sensor 20. The second sensor 22 is also fixedly arranged in relation to the engine. The second sensor at 22 is arranged to detect the second marks M21-M26 as each of them passes the second sensor 22.

The first disc 16 may for instance form part of a flywheel of the engine. Alternatively, the first disc 16 may be a separate disc directly or indirectly connected to the crankshaft of the engine and arranged to rotate with the same speed as the crankshaft. The second disc 18 may form part of a wheel directly connected to the camshaft of the engine. Alternatively, the second disc 18 may be a separate disc directly or indirectly connected to the camshaft.

In FIG. 2 the top rotational positions TRP1-TRP6 discussed above in connection with FIG. 1, and corresponding to the ignition top dead center positions of the six pistons of the engine, are indicated with radial lines for the sake of clarity only. Between each of the top rotational positions TRP1-TRP6 an interspace angle α extends. Each interspace angle α corresponds to a rotational angle of the crankshaft between two adjacent top rotational positions TRP1-TRP6.

Since the engine in these embodiments is a six-cylinder engine with equal distribution between the sixth ignition top dead center positions of the pistons, each interspace angle α is 120°. The top rotational positions TRP1-TRP6 overlap in pairs due to the crankshaft completing two full revolutions, i.e. 720°, in order for each of the six pistons to reach its ignition top dead center position.

The first disc 16 comprises a first mark M11-M13 within each interspace angle α. The second disc 18 comprises one second mark per number of cylinders of the engine, i.e. in these embodiments six second marks M21-M26.

The first marks M11-M13 are arranged in relation to each other on the first disc 16, and the second marks M21-M26 are arranged in relation to each other on the second disc 18 such that for each interspace angle α the relevant first mark M11-M13 is detectable by the first sensor 20 and the relevant second mark M21-M26 is detectable by the second sensor 22 at different relative rotational positions between the first disc 16 and the second disc 18. Accordingly, the engine control unit 24 may distinguish, for which of each of the six cylinders of the engine the piston is about to reach its ignition top dead center position based on the detected different relative rotational positions of each of the first marks M11-M13 on the first disc 16 and each of the second marks M21-M26 on the second disc 18. A particular relationship between the rotational positions of the first and second discs 16, 18 and respective particular first and second marks is associated with a particular cylinder of the engine. Based thereon, the particular cylinder may be identified. Put differently, a relative rotational distance between each of the first marks M11-M13 on the first disc 16 and each of the second marks M21-M26 on the second disc 18 within an interspace angle α differ for each of the interspace angles α. The control unit 24 analysing the signals from the first and second sensors 20, 22 obtains e.g. an increasing phase difference between pulses corresponding to first and second marks. This phase difference is unique for every interspace angle α, i.e. for every cylinder.

The first and second sensors 20, 22 may be e.g. inductive sensors, Hall effect sensors, or optical sensors. Accordingly, the first and second marks M11-M26 may comprise e.g. metallic protrusions, magnetic protrusions, reflectors, opaque protrusions, or translucent portions provided on the first and second discs 16, 18. The first and second marks may be arranged along an outer periphery of the respective first and second discs. Alternatively, the first and second marks may be arranged in or on a circular surface of the respective first and second discs.

According to some embodiments the four-stroke internal combustion engine may comprise two cylinders only. For such an engine, only one first mark is required on the first disc 16, while there are still required one second mark per cylinder on the second disc, i.e. two second marks for a two cylinder engine. In the following, embodiments of arrangements for cylinder detection in four-stroke internal combustion engines comprising two or more cylinders are discussed with reference to FIG. 2.

According to embodiments, the first mark, or each of the first marks M11-M13, may be placed at one rotational position of the first disc 16 and the first sensor 20 is positioned in relation to the first disc 16 such that the first mark, or each of the first marks M11-M13, is detectable by the first sensor 20 at a position between the ignition top dead center positions of the pistons. Each of the second marks M21-M26 may be placed at one rotational position of the second disc 18 and the second sensor 22 is positioned in relation to the second disc 18 such that each of the second marks M21-M26, is detectable by the second sensor 22 at a position between the ignition top dead center positions of the pistons. In this manner it may be ensured that the detection of the first and second marks M11-M26 does not interfere with other detecting and sensing of the first and second sensors 20, 22 at the ignition top dead center positions of the pistons. For instance, the first and second discs may be provided with further indicators, which may be utilized for controlling and/or timing functions of the engine to be performed at the ignition top dead center positions of the pistons, see also below with reference to FIG. 5a.

According to some embodiments, the first mark, or each of the first marks M11-M13, on the first disc 16 is rotationally spaced by at least 5 degrees from each position on the first disc 16 corresponding to the top rotational position, or each of the top rotational positions TRP1-TRP6, of the crankshaft. In this manner it may be ensured that the detection of the first mark or marks M11-M13 does not interfere with other detecting and sensing of the first sensor 20 around the ignition top dead centers of the pistons. For instance, the first disc 16 may be provided with further indicators, which may be utilized for controlling, and/or timing, functions of the engine to be performed around the ignition top dead center positions of the pistons, see also below with reference to FIG. 5b.

According to some embodiments, the first marks M11-M13 are arranged with equal spaces therebetween in a circumferential direction of the first disc 16. In this manner manufacturing of the first disc 16 may be simplified. Also, positioning the first disc 16 rotationally in relation to the crankshaft of an engine may be simplified. In the example embodiments of FIG. 2 comprising three first marks M11-M13 on the first disc 16, the first marks M11-M13 are arranged at 120° from each other.

According to some embodiments, at least two of the second marks M21-M26 are arranged with different spaces therebetween in a circumferential direction of the second disc 18.

In this manner manufacturing of the second disc 18 may be simplified. In the example embodiments of FIG. 2 comprising six second marks M21-M26 on the second disc 18, five of the second marks M21-M26 may be arranged at 62° from each other, while the remaining angle between the last two second marks, e.g. M26 and M21 may be arranged at 50° from each other, in total adding up to 360°.

Figure 3:
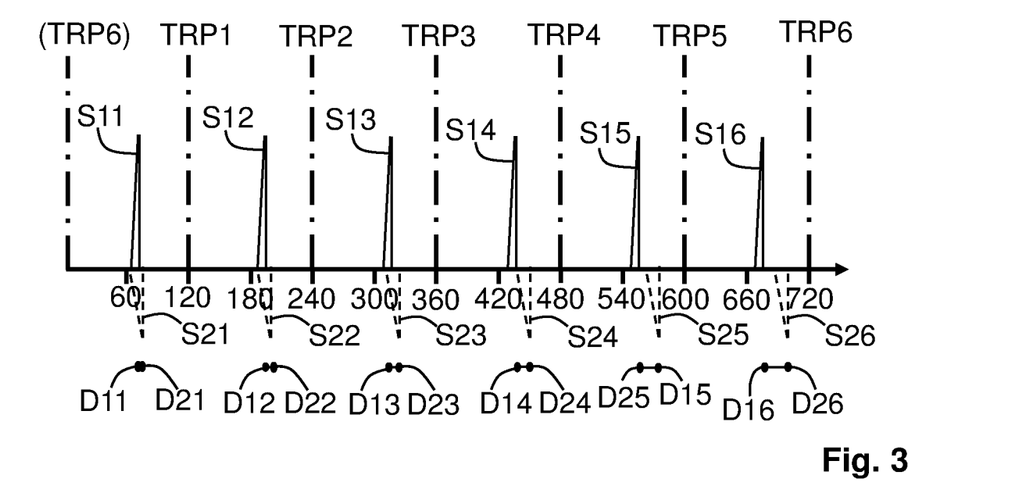
FIG. 3 shows a diagram illustrating signals from first and second sensors of the arrangement of FIG. 2, FIGS. 4a and 4b show diagrams of different relative rotational positions between first and second discs.

FIG. 3 shows a diagram illustrating signals from the first and second sensors 20, 22 of the arrangement 4 of FIG. 2. Accordingly, in the following reference is made to both FIGS. 2 and 3. Along the X axis of the diagram a 720° rotation of the crankshaft and the first disc 16 is shown. Every 120° the crankshaft reaches one of the top rotational positions TRP1-TRP6 corresponding to the ignition top dead center positions of the pistons. The 120° separation between the top rotational positions TRP1-TRP6 corresponds to the interspace angle. The top rotational positions TRP1-TRP6 shown in the diagram relate to a sequence of ignition top dead center positions of the pistons, which does not necessarily correspond to the order, in which the cylinders are arranged on the relevant engine.

The graph having spikes in the positive direction of the Y axis represents first signals S11-S16 from the first sensor 20 as each of the first marks M11-M13 on the first disc 16 are sensed by the first sensor 20. During the first 360° revolution of the first disc 16, the first marks M11-M13 generate in sequence every 120° the first signals S11-S13. During the second 360° revolution of the first disc 16, the first marks M11-M13 generate in sequence every 120° the first signals S14-S16. The graph having spikes in the negative direction of the Y axis represents second signals S21-S26 from the second sensor 22 as each of the second marks M21-M26 on the second disc 18 are sensed by the second sensor 22. As mentioned above, the second disc 18 together with the camshaft completes one 360° revolution while the crankshaft completes two full revolutions. During the 360° revolution of the second disc 18, the second signals S21-S26 are generated in sequence. The interspaces between the second signals S21-S26 is 62° on the second disc 18, while the interspace between the second signals S26 and S21 is 50°. The latter interspace occurs as the second disc 18 continues into a following 360° revolution.

Below the two graphs in FIG. 3, pairs of dots D11-D26 indicate the distance between each of the two pairs of first and second signals, S11 and S21, S12 and S22, etc. The distance may be measured in e.g. time, degrees, radians, or distance. As can be clearly seen in FIG. 3 the distance between each pair of dots D11-D26 increases over the 720° revolution of the first disc 16 and the 360° revolution of the second disc 18. Accordingly, the first marks M11-M13 are arranged in relation to each other on the first disc 16, and the second marks M21-M26 are arranged in relation to each other on the second disc 18 such that for each interspace angle the relevant first mark M11-M13 is detectable by the first sensor 20 and the relevant second mark M21-M26 is detectable by the second sensor 22 at different relative rotational positions between the first disc 16 and the second disc 18.

Figure 4A:
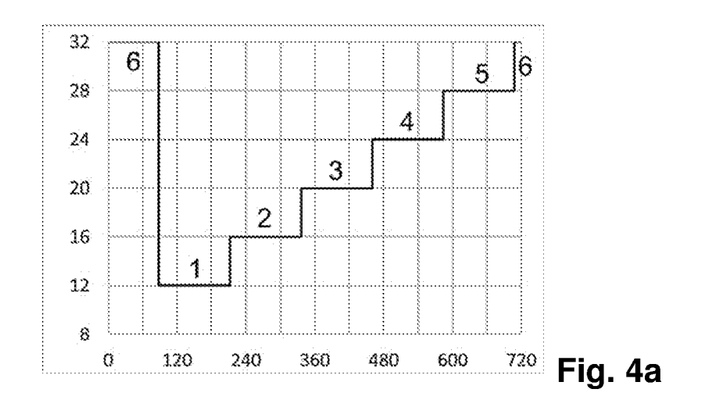
Figure 4B:
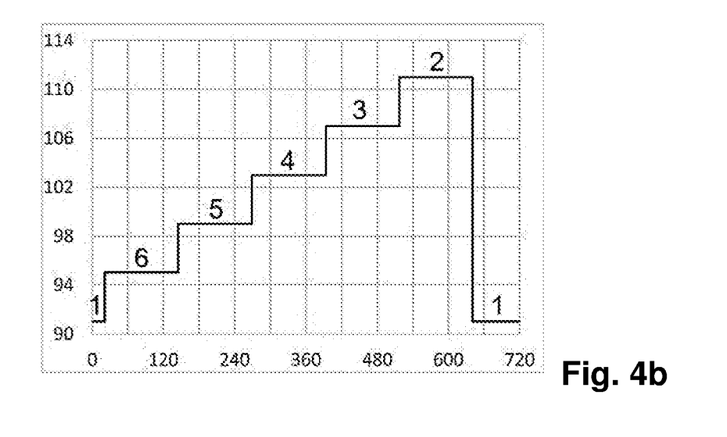

FIGS. 4*a* and 4*b* show diagrams of the different relative rotational positions between the first disc 16 and the second disc 18, at which the first marks M11-M13 are detected by the first sensor 20 and the second marks M21-M26 are detected by the second sensor 22 within each interspace angle α. The diagrams relate to the arrangement 4 of FIG. 2. Accordingly, in the following reference is made to FIGS. 4*a* and 4*b* as well as both FIGS. 2 and 3. Again, along the X axes of the diagrams a 720° rotation of the crankshaft and the first disc 16 is shown. On the Y axes of the diagrams are shown the angular differences, or phase differences, as seen on the first disc 16, between receipt of the first and second signals of the pairs of first and second signals, S11 and S21, S12 and S22, etc. within each interspace angle α from the first and second sensors 20, 22 sensing the respective first and second marks M11-M26. FIG. 4*a* illustrates the angular differences when the first disc 16, and the crankshaft, rotate in a correct direction, i.e. an operating direction of the relevant engine. FIG. 4*b* illustrates the angular differences when the first disc 16, and the crankshaft, rotate in an incorrect direction, i.e. opposite to the operating direction of the relevant engine. It may be noted, that an increment for angular differences along the X-axis in the diagrams is 213 for cases of the generalized even number of cylinders N described below with reference to FIG. 5*b*.

Referring to FIG. 4*a*, the angular difference between the first and second signals S11, S21 for the first cylinder is 12°, the angular difference between the first and second signals S12, S22 for the second cylinder is 16°, and so on all the way up to the angular difference between the first and second signals S16, S26 for the sixth cylinder being 32°. If the crankshaft of the engine for some reason should rotate in the wrong direction, referring to FIG. 4*b*, the angular difference between the first and second signals S11, S21 for the first cylinder is 91°, the angular difference between the first and second signals S12, S22 for the second cylinder is 95°, and so on all the way up to the angular difference between the first and second signals S16, S26 for the sixth cylinder being 111°. Accordingly, irrespective of the rotational position of the crankshaft within one 720° rotation, the engine control unit 24 is able to detect for which of the six cylinders the piston is about to reach its ignition top dead center position next, as soon as a first and a second signal of a pair of first and second signals has been received. Also, the direction of rotation of the crankshaft may be determined based on the angular difference between the first and second signals of a pair of first and second signals.

According to alternative embodiments there may be other interspace angles between the top rotational positions of the crankshaft than in the above discussed example embodiments, e.g. due to the relevant engine having a different number of cylinders. Accordingly, also the first marks may be positioned differently on the first disc than in the above discussed example embodiments. Similarly, the second marks may be positioned differently on the second disc than in the above discussed embodiments, e.g. different distances between the second marks may be provided between more than two of the second marks.

Figure 5A:
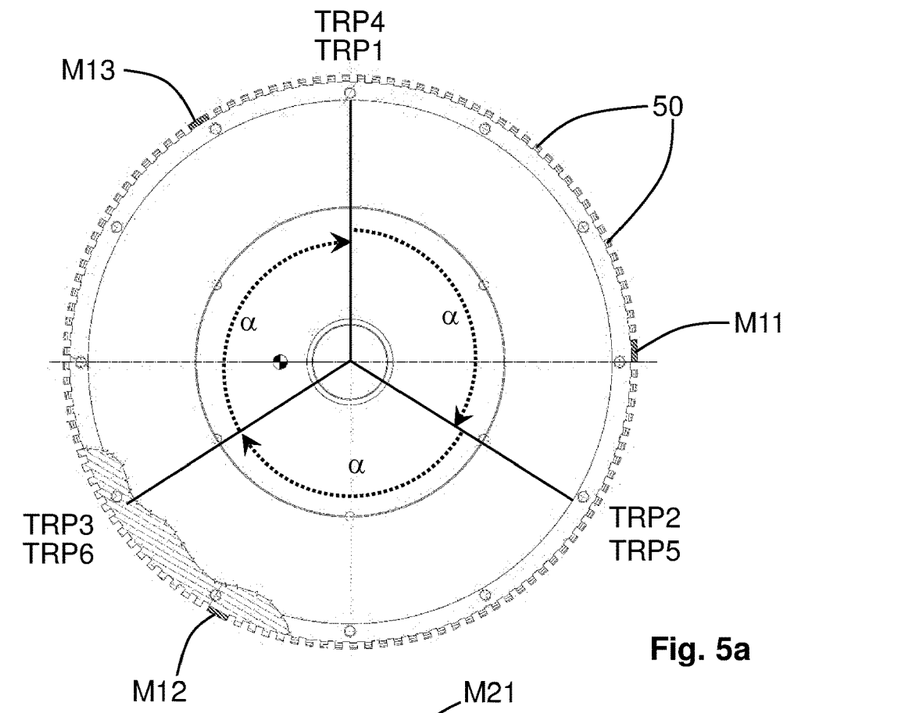
FIG. 5a illustrates embodiments of a first disc in more detail.
Figure 5B:
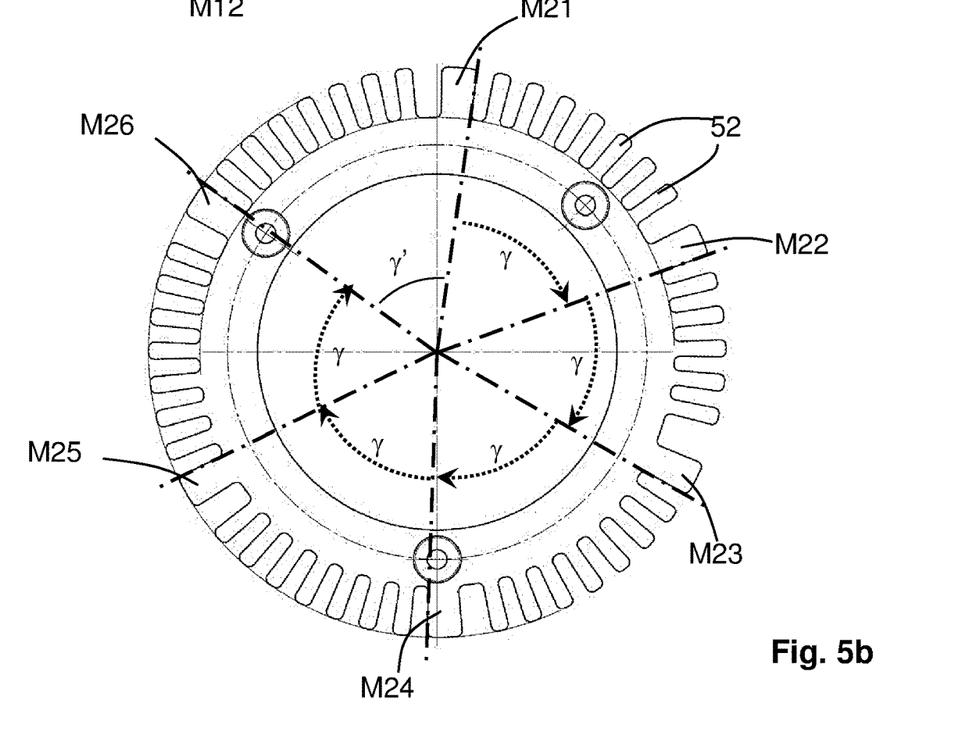
FIG. 5b illustrates embodiments of a second disc in more detail.

FIG. 5*a* illustrates embodiments of a first disc 16 in more detail, and FIG. 5*b* illustrates embodiments of a second disc 18 in more detail. Both discs 16, 18 are configured for a six-cylinder engine.

Again, the first disc 16 comprises first marks M11-M13. Each of the first marks M11-M13 is placed at one rotational position of the first disc 16 within an interspace angle α between top rotational positions TRP1-TRP6 of a corresponding crankshaft, and indicated with radial lines in FIG. 5*a*. Again, the second disc 18 comprises second marks M21-M26. Each of the second marks M21-M26 is placed at one rotational position of the second disc 18 such that when the second disc 18 is connected to a camshaft of the relevant engine, each of the second marks, is detectable by the second sensor at a position between the ignition top dead center positions of the pistons.

According to embodiments, the first disc 16 may comprise numerous equally circumferentially spaced first indicators 50 arranged between the first marks M11-M13. The first marks M11-M13 are distinguishable from the first indicators 50. In this manner a first sensor may sense not only the first marks M11-M13, but also the first indicators 50. The signals from the first sensor relating to the first indicators 50 may be used for general control of a relevant internal combustion engine, and/or for control of specific functions in the combustion engine. Owing to the provision of the first marks M11-M13 one or more rotational positions of the first disc 16 may be established. From such one or more established rotational positions, the first indicators 50 may be used for counting and/or measuring further rotation of the first disc 16. Such counting and measuring may e.g. relate to time, angle or distance.

Each of the first marks M11-M13 on the first disc 16 may be rotationally spaced by at least 5 degrees from each position on the first disc corresponding to each of the top rotational positions TRP1-TRP6 of a relevant crankshaft. In this manner one or more of the indicators 50 may be provided between each of the first marks M11-M13 for permitting the first sensor to provide signals in a sector of the first disc 16 around each of the top rotational positions TRP1-TRP6. Such signals in a sector of the first disc 16 around the top rotational positions may be utilized e.g. for controlling fuel injection into the cylinders of the engine.

According to embodiments, the second disc 18 may comprise numerous equally circumferentially spaced second indicators 52 arranged between the second marks M21-M26. The second marks M21-M26 are distinguishable from the second indicators 52. In this manner a second sensor may sense not only the second marks M21-M26, but also the second indicators 52. The signals from the second sensor relating to the second indicators 52 may be used for controlling functions in a relevant engine.

Each of the first and second discs 16, 18 may be utilized for engine control on its own. Should be e.g. one of the first and second sensors for sensing the first and second marks and the first and second indicators fail, the engine may be controlled based on signals from the functioning sensor, albeit with reduced engine performance.

Each of the first marks M11-M13 may have a same length in a circumferential direction of the first disc 16. Suitably, each of the first indicators 50 may have a same length in a circumferential direction of the first disc 16.

According to alternative embodiments, one or more of the first marks may have different lengths in a circumferential direction of the first disc. In this manner one rotational position of the first disc may be established based on the length of one first mark alone.

Each of the second marks M21-M26 may have a same length in a circumferential direction of the second disc 18. Suitably, each of the second indicators 52 may have a same length in a circumferential direction of the second disc 18.

According to some embodiments, the first marks M11-M13 may be arranged with equal spaces therebetween in a circumferential direction of the first disc 16. According to some embodiments, at least two of the second marks M21-M26 are arranged with different spaces therebetween in a circumferential direction of the second disc 18. However, the only actual limitations for the positions of the first and second marks M11-M26 is that each of them is arranged within a frame of an interspace angle, and that there has to be a different distance between the first and second marks within each interspace angle, i.e. for none of the interspace angles the distance between pairs of first and second marks can be the same.

According to some embodiments involving an engine comprising an even number of cylinders N, the following generalization may be applied: In case of equidistant interspace angles α between the first marks, the second marks may have a separation angle γ of α/2+β for first N−1 sectors and a separation angle γ' for the last sector γ'=360°−(α/2+β)*(N−1) closes the sequence to complete the 360° revolution of the second disc. The angle β is an angle increment to form unique rotational distances between each of the first and second marks. The size of the angle β is selected based on the number of cylinders and such that the separation angle γ' for the last sector is different from the first N−1 sectors.

Figure 6:
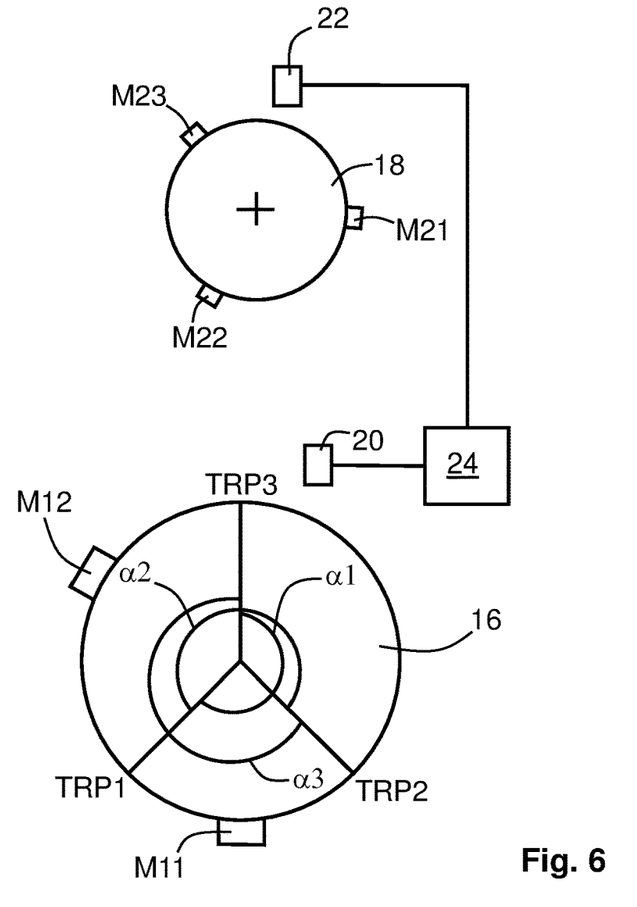
FIG. 6 illustrates embodiments of an arrangement for cylinder detection in a four-stroke internal combustion engine.

FIG. 6 illustrates embodiments of an arrangement 4 for cylinder detection in a four-stroke internal combustion engine. These embodiments resemble in much the embodiments of FIG. 2. However, in these example embodiments the relevant engine is a three cylinder engine, and one purpose of the following discussion is to clarify the invention in relation to embodiments wherein the engine has an uneven number of cylinders. Accordingly, only the main differences with the embodiments of FIG. 2 will be discussed in the following.

Again, the arrangement 4 comprises a first disc 16, a second disc 18, a first sensor 20, a second sensor 22, and a combustion engine control unit 24. The first disc 16 comprises a number of first marks M11-M12. The second disc 18 comprises a number of second marks M21-M23. The crankshaft of the three cylinder four-stroke internal combustion engine comprises three top rotational positions TRP1-TRP3 corresponding to the ignition top dead center positions of the three pistons of the engine. Again, the top rotational positions TRP1-TRP3 are indicated with radial lines for the sake of clarity. Between each of the top rotational positions TRP1-TRP3 an interspace angle α extends. Each interspace angle α corresponds to a rotational angle of the crankshaft between two adjacent top rotational positions TRP1-TRP3. In these embodiments the top rotational positions TRP1-TRP3 are separated by 240°, i.e. the interspace angles α are 240° in these embodiments. Thus, over two full revolutions of the first disc 16, i.e. 720°, each of the three pistons reaches its ignition top dead center position.

Again, the first disc 16 comprises a first mark M11, M12 within each interspace angle α, and the second disc 18 comprises one second mark per number of cylinders of the engine, i.e. in these embodiments the second marks M21-M23.

Within the first interspace angle α1 the first first mark M11 is arranged on the first disc 16. The second first mark M12 is arranged within the second interspace angle α2. Within the third interspace angle α3 both first marks M11 and M12 are arranged. Thus, at least one first mark M11, M12 is arranged in each interspace angle α. In combination with the three second marks M21-M23 on the second disc 18, the next cylinder for which the piston is about to reach its ignition top dead center position is detectable. For the third interspace angle α3 the first sensor 20 will sense both first marks M11, M12. However, the engine control unit 24 may be set to ignore one of the first marks M11, M12, which is not followed by a signal from the second sensor 22 relating to the third second mark M23.

Accordingly, also in these embodiments the first marks M11, M12 are arranged in relation to each other on the first disc 16, and the second marks M21-M23 are arranged in relation to each other on the second disc 18 such that for each interspace angle α the relevant first mark M11, M12 is detectable by the first sensor 20 and the relevant second mark M21-M23 is detectable by the second sensor 22 at different relative rotational positions between the first disc 16 and the second disc 18. Thus, the engine control unit 24 may distinguish, for which of each of the three cylinders of the engine the piston is about to reach its ignition top dead center position based on the detected different relative rotational positions of each of the first marks M11, M12 on the first disc 16 and each of the second marks M21-M23 on the second disc 18.

The principle of ignoring a first mark on the first disc 16, which is not followed by a second of mark on the second disc 18, may be utilized in alternative embodiments. For instance, interspace angles may comprise more than one first mark for internal combustion engines comprising an even number of cylinders as well as internal combustion engines comprising an uneven number of cylinders. For instance, by utilizing this principle the same type of first and second discs may be shared by different types of four-stroke internal combustion engine. The engine control units of the relevant engine types have to be programed to utilize the first and second marks relevant for the particular engine type.

Figure 7:
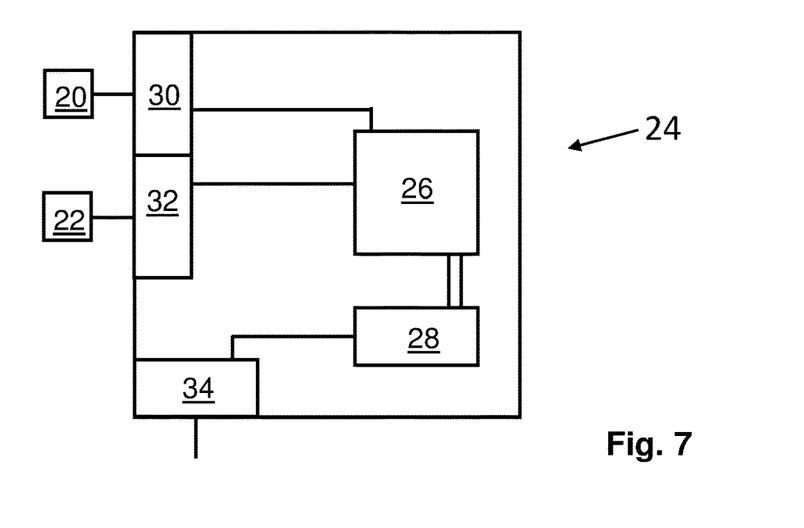
FIG. 7 illustrates embodiments of an engine control unit of an arrangement for cylinder detection in a four-stroke internal combustion engine.

FIG. 7 illustrates embodiments of an engine control unit 24 of an arrangement 4 for cylinder detection in a four-stroke internal combustion engine 2. The engine 2 may be an engine 2 as discussed in connection with FIGS. 1-6. However, the engine 2 may be any four-stroke internal combustion engine 2 comprising at least two cylinders.

The combustion engine control unit 24 comprises a calculation unit 26 which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as, e.g., any, some or all of the ones mentioned above. The engine control unit 24 comprises a memory unit 28. The calculation unit 26 is connected to the memory unit 28, which provides the calculation unit 26 with, for example, the stored programme code and/or stored data which the calculation unit 26 needs to enable it to do calculations. The calculation unit 26 is also adapted to store partial or final results of calculations in the memory unit 28. The memory unit 28 may comprise a physical device utilized to store data or programs, i.e., sequences of instructions, on a temporary or permanent basis. According to some embodiments, the memory unit 28 may comprise integrated circuits comprising silicon-based transistors. The memory unit 28 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The engine control unit 24 is further provided with respective devices 30, 32, 34 for receiving and/or sending input and output signals. These input and output signals may comprise waveforms, pulses or other attributes which the input signal receiving devices 30, 32 can detect as information and which can be converted to signals processable by the calculation unit 26. These signals are then supplied to the calculation unit 26. The output signal sending device 34 is arranged to convert calculation results from the calculation unit 26 to output signals for conveying to other parts of the engine's control system and/or the component or components for which the signals are intended, such as e.g. a fuel injector of a relevant cylinder. Each of the connections to the respective devices 30, 32, 34 for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, the invention is implemented in the engine control unit 24 but might alternatively be implemented wholly or partly in one or more other control units.

The combustion engine control unit 24 communicates with the first and second sensors 20, 22 via the input devices 30, 32. Thus, the engine control unit 24 may receive signals from the first and second sensors 20, 22, e.g. when the first marks and second marks are sensed by the first and second sensors 20, 22.

Accordingly, the combustion engine control unit 24 may be configured to identify first signals related to the first mark, or the first marks, based on signals received from the first sensor 20, and the combustion engine control unit 24 may be configured to identify second signals related to the second marks, based on signals received from the second sensor 22. The calculation unit 26 of the engine control unit 24 may identify the first and second signals based on signals received from the first and second sensors 20, 22. The calculation unit 26 may be configured to base calculations on the identified first signals and second signals. For instance, different relative rotational positions of the first and second marks on the first and second discs when the first and second signals have been received may be calculated by the calculation unit 26, and a particular cylinder may be detected based on the calculation, i.e. the particular cylinder of all cylinders, for which the piston will reach the ignition top dead center position next in time.

According to some embodiments, the combustion engine control unit 24 may be configured to identify a phase difference between the first signals and the second signals. In this manner the phase difference between the first and second signals emanating from the first and second marks may be utilized for distinguishing the different cylinders of the internal combustion engine 2. The calculation unit 26 of the engine control unit 24 may calculate the phase difference. The phase difference may be expressed e.g. in degrees, radians, time, or distance. The phase difference is one example of how to determine the relative rotational positions of the first and second discs when the first and second signals have been received.

According to some embodiments, the combustion engine control unit 24 may be configured to identify a varying phase difference between the first signals and the second signals, and the combustion engine control unit 24 may be configured to evaluate the varying phase difference to determine a momentary rotational position of the crankshaft. A particular phase difference is associated with a particular cylinder of the engine 2. Thus, based on the identified phase difference, of the varying phase difference between the first and second signals, a particular cylinder may be identified. Again, the calculation unit 26 of the engine control unit 24 may calculate the phase difference. The varying phase difference between a number of first and second signals is one example of how to determine the relative rotational positions of the first and second discs when the first and second signals have been received.

Figure 8:
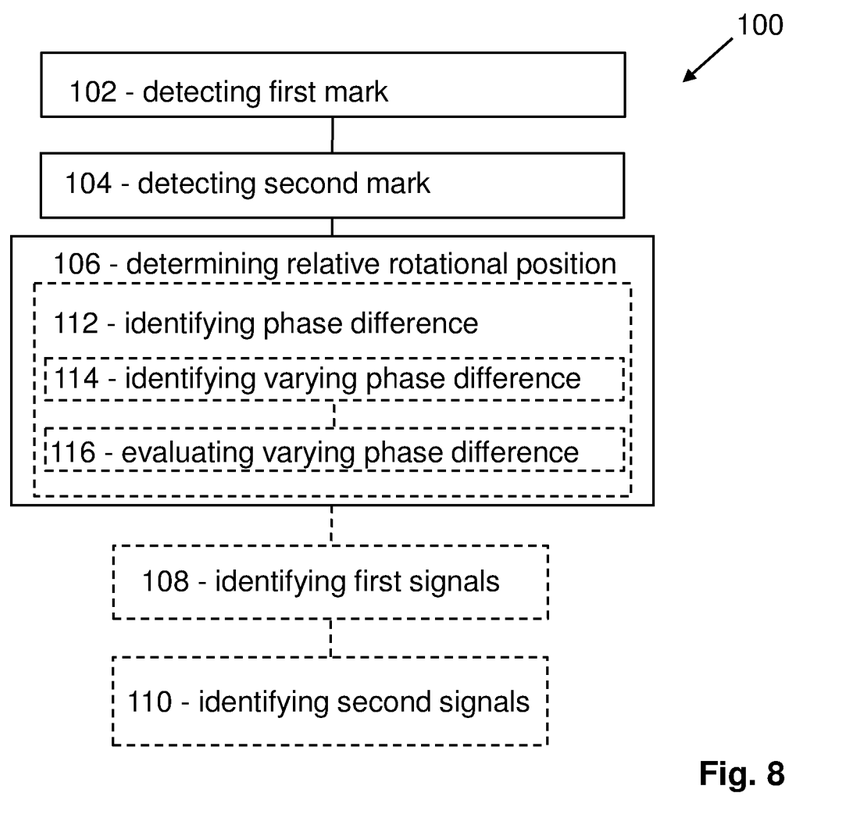
FIG. 8 illustrates embodiments of a method for cylinder detection in a four-stroke internal combustion engine.

FIG. 8 illustrates embodiments of a method 100 for cylinder detection in a four-stroke internal combustion engine. The four-stroke internal combustion engine is a four-stroke internal combustion engine 2 comprising at least two cylinders according to any one of the aspects and/or embodiments discussed herein. The four-stroke internal combustion engine comprises an arrangement 4 for cylinder detection in a four-stroke internal combustion engine according to any one of the aspects and/or embodiments discussed herein.

The method 100 comprises steps of:
detecting 102 the first mark, or one of the first marks, with the first sensor,
detecting 104 one of the second marks with the second sensor, and
determining 106 a relative rotational position between the first disc and the second disc based on the step of detecting 102 the first mark, or one of the first marks, and the step of detecting 104 one of the second marks.

According to embodiments, the method 100 may comprise steps of:
identifying 108 first signals related to the first mark, or the first marks, based on signals received from the first sensor, and
identifying 110 second signals related to the second marks, based on signals received from the second sensor, wherein the step of determining 106 a relative rotational position comprises a step of:
identifying 112 a phase difference between the first signals and the second signals.

According to embodiments, the step of identifying 112 a phase difference between the first signals and the second signals may comprise steps of:
identifying 114 a varying phase difference between the first signals and the second signals, and
evaluating 116 the varying phase difference to determine the relative rotational position between the first and second discs.

The method comprising steps 102-116 discussed above may be performed in the control unit 24 discussed in connection with FIG. 7, and may be implemented through the one or more calculation units 26 within the control unit 24. A computer program product 90 as discussed below, comprising instructions for performing the steps 102-116 in the control unit 24 may perform the method 100 comprising at least some of the steps 102-116 for cylinder detection in a four-stroke internal combustion engine, when the computer program is loaded into the one or more calculation units 26 of the control unit 24.

One skilled in the art will appreciate that the method 100 may be implemented by programmed instructions. These programmed instructions are typically constituted by a computer program, which, when it is executed in a computer or control unit, ensures that the computer or control unit carries out the desired control, such as the method steps 102-116. The computer program is usually part of a computer programme product which comprises a suitable digital storage medium on which the computer program is stored. Accordingly, the invention further relates to a computer program for performing a method 100 for cylinder detection in a four-stroke internal combustion engine, wherein the computer program comprises computer readable code configured to cause a calculation unit of a combustion engine control unit to perform a method 100 according to any one of aspects and embodiments discussed herein.

Figure 9:
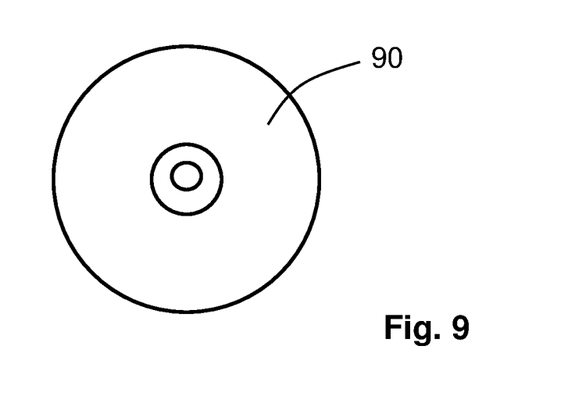
FIG. 9 illustrates a computer program product.

FIG. 9 illustrates a computer program product 90 for performing a method for cylinder detection in a four-stroke internal combustion engine in the form of a CD Rom disc.

Thus, the invention also relates to a computer program product 90 for performing a method for cylinder detection in a four-stroke internal combustion engine, wherein the computer program comprises computer readable code configured to cause a calculation unit of a combustion engine control unit of the four-stroke internal combustion engine to perform a method according to any one of aspects and embodiments discussed herein.

The computer program product 90 is provided for instance in the form of a data carrier carrying computer program code for performing at least some of the steps 102-116 according to some embodiments when being loaded into the one or more calculation units 26 of the control unit 24 discussed in connection with FIG. 7. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 24 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. For instance, the first and/or second marks may be formed by open spaces of identifiable length instead of protrusions.

The invention claimed is:

1. An arrangement for cylinder detection in a four-stroke internal combustion engine, the four-stroke internal combustion engine comprising a crankshaft, at least two cylinders each associated with a respective piston, and a camshaft connected to the crankshaft, wherein the crankshaft performs a 720-degree rotation while the camshaft performs a 360-degree rotation, wherein each piston is connected to the crankshaft and reciprocates in its cylinder, each piston being arranged to assume an ignition top dead center position corresponding to a top rotational position (TRP1-TRP6) of the crankshaft over the 720-degree rotation of the crankshaft, wherein an interspace angle ($\alpha$) of the crankshaft extends between each of the top rotational positions (TRP1-TRP6), wherein the arrangement comprises:
   a first disc connected to the crankshaft, the first disc comprising a first mark (M11-M13) within each interspace angle ($\alpha$);
   a second disc connected to the camshaft and comprising one second mark (M21-M26) per number of cylinders;
   a fixed first sensor for detecting the first mark (M11-M13), or a plurality of first marks (M11-M13);
   a fixed second sensor for detecting the second marks (M21-M26),
      wherein the first mark (M11-M13) is arranged on the first disc, or the plurality of first marks (M11-M13) are arranged in relation to each other on the first disc, and the second marks (M21-M26) are arranged in relation to each other on the second disc such that for each interspace angle ($\alpha$), the relevant first mark (M11-M13) on the first disc is detectable by the first sensor and the relevant second mark (M21-M26) on the second disc is detectable by the second sensor at a respective different relative rotational position between the first disc and the second disc, wherein such different relative rotational position defines a phase difference between the respective relative first mark and the second mark, wherein such phase difference identifies a particular cylinder of the at least two cylinders; and
   a combustion engine control unit configured to:
      receive signals from the first fixed sensor and the second fixed sensor;
      identify first signals (S11-S16) related to the relevant first mark (M11-M13), or the plurality of relevant first marks (M11-M13), based on signals received from the first sensor and identify second signals (S21-S26) related to the relevant second mark (M21-M26), or the plurality of relevant second marks (M21-M26), based on signals received from the second sensor; and
      identify the phase difference between the first signals (S11-S16) and the second signals (S21-S26) indicating when the relevant first mark (M11-M13), or the plurality of relevant first marks (M11-M13) was detected relative to when the relevant second mark (M21-M26), or the plurality of relevant second marks (M21-M26) was detected, and wherein the combustion engine control unit is configured to evaluate the phase difference to determine a momentary rotational position of the crankshaft, where the phase difference is associated with a particular cylinder for which its associated piston is approaching the piston's ignition top dead center position.

2. The arrangement according to claim 1, wherein the first mark (M11-M13), or each of the plurality of first marks (M11-M13), is placed at one rotational position of the first disc and the first sensor is positioned in relation to the first disc such that the first mark (M11-M13), or each of the plurality of first marks (M11-M13), is detectable by the first sensor at a position between the ignition top dead center positions of the pistons, and
   wherein each of the second marks (M21-M26) is placed at one rotational position of the second disc and the second sensor is positioned in relation to the second disc such that each of the second marks (M21-M26) is detectable by the second sensor at a position between the ignition top dead center positions of the pistons.

3. The arrangement according to claim 1, wherein the first disc comprises numerous equally circumferentially spaced first indicators arranged between the plurality of first marks (M11-M13), and wherein the first mark (M11-M13), or the plurality of first marks (M11-M13), is/are distinguishable from the first indicators.

4. The arrangement according to claim 3, wherein the first mark (M11-M13), or each of the plurality of first marks (M11-M13), on the first disc is rotationally spaced by at least 5 degrees from each position on the first disc corresponding to the top rotational position (TRP1-TRP6), or each of the top rotational positions (TRP1-TRP6), of the crankshaft.

5. The arrangement according to claim 1, wherein the second disc comprises numerous equally circumferentially spaced second indicators arranged between the second marks (M21-M26), and wherein the second marks (M21-M26) are distinguishable from the second indicators.

6. The arrangement according to claim 1, wherein the first marks (M11-M13) are arranged with equal spaces therebetween in a circumferential direction of the first disc.

7. The arrangement according to claim 1, wherein at least two of the second marks (M21-M26) are arranged with different spaces therebetween in a circumferential direction of the second disc.

8. The arrangement according to claim 1, wherein an interspace angle ($\alpha$) of the crankshaft between selected first and second marks corresponds to a piston, and wherein the interspace angle between each set of first and second marks is different for each set of first and second marks so as to uniquely designate each piston.

9. A four-stroke internal combustion engine comprising:
a crankshaft;
at least two cylinders each associated with a respective piston;
a camshaft connected to the crankshaft, wherein the crankshaft performs a 720-degree rotation while the camshaft performs a 360-degree rotation, wherein each piston is connected to the crankshaft and reciprocates in its cylinder, each piston being arranged to assume an ignition top dead center position corresponding to a top rotational position (TRP1-TRP6) of the crankshaft over the 720-degree rotation of the crankshaft, wherein an interspace angle ($\alpha$) of the crankshaft extends between each of the top rotational positions (TRP1-TRP6); and
an arrangement for cylinder detection comprising:
a first disc connected to the crankshaft, the first disc comprising a first mark (M11-M13) within each interspace angle ($\alpha$);
a second disc connected to the camshaft and comprising one second mark (M21-M26) per number of cylinders;
a fixed first sensor for detecting the first mark (M11-M13), or a plurality of first marks (M11-M13);
a fixed second sensor for detecting the second marks (M21-M26),
wherein the first mark (M11-M13) is arranged on the first disc, or the plurality of first marks (M11-M13) are arranged in relation to each other on the first disc, and the second marks (M21-M26) are arranged in relation to each other on the second disc such that for each interspace angle ($\alpha$), the relevant first mark (M11-M13) on the first disc is detectable by the first sensor and the relevant second mark (M21-M26) on the second disc is detectable by the second sensor at a respective different relative rotational position between the first disc and the second disc, wherein such different relative rotational position defines a phase difference between the respective relative first mark and the second mark, wherein such phase difference identifies a particular cylinder of the at least two cylinders; and
a combustion engine control unit configured to:
receive signals from the first fixed sensor and the second fixed sensor;
identify first signals (S11-S16) related to the relevant first mark (M11-M13), or the plurality of relevant first marks (M11-M13), based on signals received from the first sensor and identify second signals (S21-S26) related to the relevant second mark (M21-M26), or the plurality of relevant second marks (M21-M26), based on signals received from the second sensor; and
identify the phase difference between the first signals (S11-S16) and the second signals (S21-S26) indicating when the relevant first mark (M11-M13), or the plurality of relevant first marks (M11-M13) was detected relative to when the relevant second mark (M21-M26), or the plurality of relevant second marks (M21-M26) was detected, and wherein the combustion engine control unit is configured to evaluate the phase difference to determine a momentary rotational position of the crankshaft, where the phase difference is associated with a particular cylinder for which its associated piston is approaching the piston's ignition top dead center position.

10. A method for cylinder detection in a four-stroke internal combustion engine, the four-stroke internal combustion engine comprising a crankshaft, at least two cylinders each associated with a respective piston, and a camshaft connected to the crankshaft, wherein the crankshaft performs a 720-degree rotation while the camshaft performs a 360-degree rotation, wherein each piston is connected to the crankshaft and reciprocates in its cylinder, each piston being arranged to assume an ignition top dead center position corresponding to a top rotational position (TRP1-TRP6) of the crankshaft over the 720-degree rotation of the crankshaft, wherein an interspace angle ($\alpha$) of the crankshaft extends between each of the top rotational positions (TRP1-TRP6), wherein the arrangement comprises a first disc connected to the crankshaft, the first disc comprising a first mark (M11-M13) within each interspace angle ($\alpha$); a second disc connected to the camshaft and comprising one second mark (M21-M26) per number of cylinders; a fixed first sensor for detecting the first mark (M11-M13), or plurality of first marks (M11-M13); a fixed second sensor for detecting the second marks (M21-M26); and a combustion engine control unit configured to receive signals from the first sensor and the second sensor, wherein the first mark (M11-M13) is arranged on the first disc, or the plurality of first marks (M11-M13) are arranged in relation to each other on the first disc, and the second marks (M21-M26) are arranged in relation to each other on the second disc such that for each interspace angle ($\alpha$), the relevant first mark (M11-M13) on the first disc is detectable by the first sensor and the relevant second mark (M21-M26) on the second disc is detectable by the second sensor at a respective different relative rotational position between the first disc and the second disc, wherein such different relative rotational position defines a phase difference between the respective relative first mark and the second mark, wherein such phase difference identifies a particular cylinder of the at least two cylinders, and wherein the method comprises steps of:
detecting the relevant first mark (M11-M13), or one of the plurality of relevant first marks (M11-M13), with the first sensor;
detecting the relevant second mark (M21-M26), or the plurality of relevant second marks (M21-M26) with the second sensor;
identifying first signals related to the relevant first mark (M11-M13), or the plurality of relevant first marks (M11-M13), based on a signal received from the first sensor;

identifying second signals related to the relevant second mark (M21-M26), or the plurality of relevant second marks (M21-M26), based on signals received from the second sensor, indicating when the relevant first mark (M11-M13), or the plurality of relevant first marks (M11-M13) was detected relative to when the relevant second mark (M21-M26), or the plurality of relevant second marks (M21-M26) was detected; and determining a relative rotational position between the first disc and the second disc based on the step of detecting the relevant first mark (M11-M13), or one of the plurality of relevant first marks (M11-M13), and the step of detecting one of the relevant second marks (M21-M26) or one of the plurality of relevant second marks (M21-M26), wherein said determining comprises:

identifying a phase difference between the first signals and the second signals; and evaluating the phase difference to determine the relative rotational position between the first and second discs, where the phase difference is associated with a particular cylinder for which its associated piston is approaching the piston's ignition top dead center position.

11. A computer program product stored on a non-transitory computer-readable medium, said computer program product for performing a cylinder detection in a four-stroke internal combustion engine, the four-stroke internal combustion engine comprising a crankshaft, at least two cylinders with one piston each, and a camshaft connected to the crankshaft, wherein the crankshaft performs a 720-degree rotation while the camshaft performs a 360-degree rotation, wherein each piston is connected to the crankshaft and reciprocates in its cylinder, each piston being arranged to assume an ignition top dead center position corresponding to a top rotational position (TRP1-TRP6) of the crankshaft over the 720-degree rotation of the crankshaft, wherein an interspace angle ($\alpha$) of the crankshaft extends between each of the top rotational positions (TRP1-TRP6), wherein the arrangement comprises a first disc connected to the crankshaft, the first disc comprising a first mark (M11-M13) within each interspace angle ($\alpha$); a second disc connected to the camshaft and comprising one second mark (M21-M26) per number of cylinders; a fixed first sensor for detecting the first mark (M11-M13), or plurality of first marks (M11-M13); a fixed second sensor for detecting the second marks (M21-M26); and a combustion engine control unit configured to receive signals from the first sensor and the second sensor, wherein the first mark (M11-M13) is arranged on the first disc, or the plurality of first marks (M11-M13) are arranged in relation to each other on the first disc and the second marks (M21-M26) are arranged in relation to each other on the second disc such that for each interspace angle ($\alpha$) the relevant first mark (M11-M13) on the first disc is detectable by the first sensor and the relevant second mark (M21-M26) on the second disc is detectable by the second sensor at a respective different relative rotational position between the first disc and the second disc, wherein such different relative rotational position defines a phase difference between the respective relative first mark and the second mark, wherein such phase difference identifies a particular cylinder of the at least two cylinders, wherein the computer program product comprises computer instructions to cause one or more calculation units of a combustion engine control unit of the four-stroke internal combustion engine to perform the following operations:

detecting the relevant first mark (M11-M13), or one of the plurality of relevant first marks (M11-M13), with the first sensor;

detecting the relevant second mark (M21-M26), or the plurality of relevant second marks (M21-M26) with the second sensor;

identifying first signals related to the relevant first mark (M11-M13), or the plurality of relevant first marks (M11-M13), based on a signal received from the first sensor;

identifying second signals related to the relevant second mark (M21-M26), or the plurality of relevant second marks (M21-M26), based on signals received from the second sensor, indicating when the relevant first mark (M11-M13), or the plurality of relevant first marks (M11-M13) was detected relative to when the relevant second mark (M21-M26), or the plurality of relevant second marks (M21-M26) was detected; and determining a relative rotational position between the first disc and the second disc based on the step of detecting the relevant first mark (M11-M13), or one of the plurality relevant first marks (M11-M13), and the step of detecting one of the relevant second marks (M21-M26), or one of the plurality of relevant second marks (M21-M26), wherein said determining comprises:

identifying a phase difference between the first signals and the second signals; and evaluating the phase difference to determine the relative rotational position between the first and second discs, where the phase difference is associated with a particular cylinder for which its associated piston is approaching the piston's ignition top dead center position.

* * * * *